V. C. STANLEY.
ELECTRODE FOR STORAGE BATTERIES.
APPLICATION FILED FEB. 4, 1920.
1,388,530.
Patented Aug. 23, 1921.
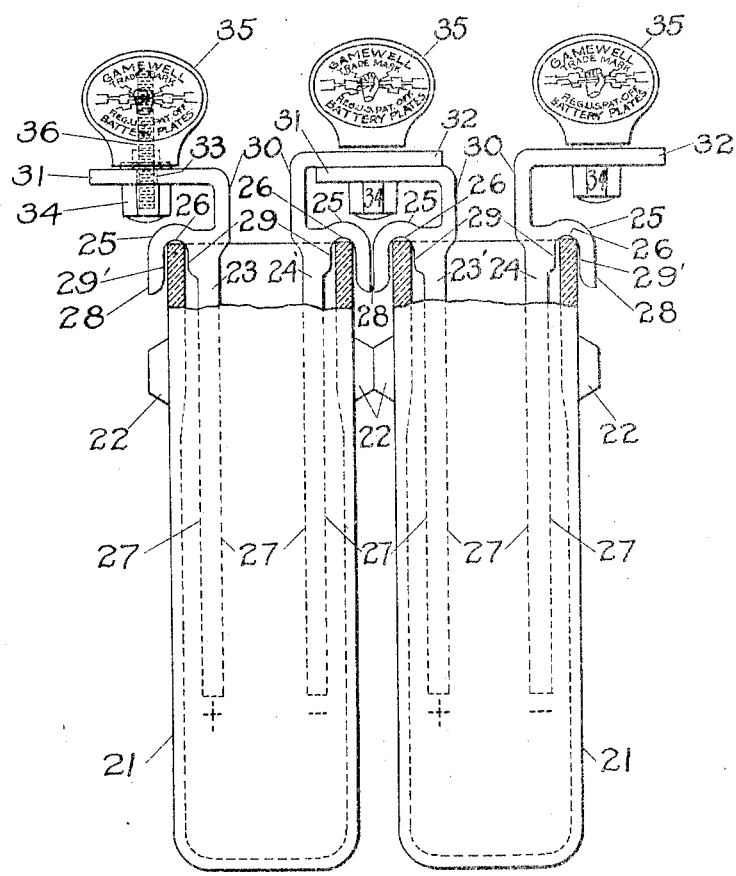
INVENTOR
Vincent C. Stanley
BY
C. E. Beach,
ATTORNEY

UNITED STATES PATENT OFFICE.

VINCENT C. STANLEY, OF BROOKLINE, MASSACHUSETTS, ASSIGNOR TO THE GAME-WELL FIRE ALARM TELEGRAPH COMPANY, OF NEW YORK, N. Y., A CORPORATION OF NEW YORK.

ELECTRODE FOR STORAGE BATTERIES.

1,388,530.     Specification of Letters Patent.     Patented Aug. 23, 1921.

Application filed February 4, 1920. Serial No. 356,305.

*To all whom it may concern:*

Be it known that I, VINCENT C. STANLEY, a citizen of the United States, residing at Brookline, county of Norfolk, and State of Massachusetts, have invented certain new and useful Improvements in Electrodes for Storage Batteries, of which the following is a specification.

This invention relates to electrodes for storage batteries, and is particularly adapted for use in comparatively small storage battery cells, such as, for example, those generally employed for supplying individual circuits of fire and police alarm systems.

Heretofore, storage cells have been provided with couples comprising one or more positive plates attached to one end of a connecting strap and a suitable one or more negative plates attached to the other end of such strap. The end cells of batteries, in which such couples are employed, are ordinarily provided with terminal elements comprising like numbers of plates of one or the other polarity, respectively; such terminal plates being provided with cell engaging and connection supporting members which render them unsuited for use as component parts of a unit couple.

Such prior couples have most frequently been of the so-called two-plate type, *i. e.*, have consisted of one positive plate and one negative plate connected by a flexible strap. In order to decrease bulk during shipment and to facilitate such disposal and support in shipping packages as to minimize damage during transit, it has been customary to transport such couples without bending the connecting straps thereof, each pair of plates and the connecting strap therebetween being disposed in a common plane, and the straps being sufficiently flexible to render them easily bent in any desired form.

When such prior couples are to be mounted in battery cells, it has been necessary to first form or bend the straps, and lack of adequate facilities and skill have frequently resulted in such bending being so accomplished as to cause faulty alinement of the plates. Even when the connecting straps of such electrodes have been bent in the intended manner,—the handling to which they must be subjected, between the bending operation and their final positioning within adjacent cells of a battery, has been found to frequently cause such distortion as to result in faulty alinement of the plates. Faulty plate alinement impairs the appearance of any battery in which it occurs, and is likely to cause or substantially contribute to accidental contacts between plates of opposite polarity and failures to provide adequate space for circulation of electrolyte between plates and cell walls adjacent thereto.

When permanently connected couples are to be installed, if surplus elements are to be provided so as to take the place of any damaged in shipment or otherwise,—extra couples and extra terminals of each polarity must be provided, as the individual electrodes of such couples are not suited for use as terminal elements, and vice versa.

Furthermore, the use of such permanently connected couples has developed a practice of replacing an entire couple whenever either element thereof requires renewal, although the negative elements of such couples would otherwise be capable of furnishing effective service for a long period after such renewals thereof. The expense and inconvenience incident to disconnecting negative elements and reassembling them with new positive elements, considered with the likelihood of having occasion to reverse such process before the new positive elements are exhausted, as well as the lack of facilities for such work at many plants, has caused this wasteful procedure to be generally followed.

Small cells, such as those to which this invention is particularly adapted, are frequently set up by inexperienced persons, who are likely to inadvertently connect couples comprising electrodes of like polarity for adjacent cells, although the use of such couples will result in decreased efficiency and injury to plates so assembled. Such batteries are sometimes installed in cells having opaque walls or in locations which do not afford a clear view of the sides of the cells. The edges of plates of opposite polarity are very similar in appearance, and when such plates are mounted in usual face to face relation, it is therefore difficult to make sure that all couples have been so placed as to provide the intended alternation of electrode polarity. For the foregoing reasons it frequently happens that one or more of the couples of a battery are reversed when first set up, and that such reversal is not discovered upon subsequent visual examination of the cells, nor until the cells have been subjected to charging current for a period sufficiently great to permanently injure the electrodes of such reversed couples.

In the use of storage batteries comprising comparatively small cells, occasions arise when it is desirable to ascertain if any of the connections in the circuit are loose, and to tighten same if the occasion requires; the battery being connected in a working circuit during such examination and tightening of contacts. Such working circuits frequently include aerial line wires which are exposed to accidental contact with lighting and power circuits from which they may become charged with a potential likely to injure those coming in contact therewith. Occasions also arise when it is desired to transfer storage battery electrode couples from one position to another or to remove exhausted electrodes from storage battery cells and substitute new electrodes therefor, without establishing an electrical connection between the person making such transfers and the current path through such battery.

An object of this invention is to provide a storage battery electrode adapted to serve equally well either as an end element or as a member of a couple.

Another object of this invention is to provide an electrode, which, when employed either as an end element or as a member of a couple, will assure suitable spacing between the adjacent faces of the plates and cell walls in order to permit desired circulation of electrolyte therebetween.

Another object of this invention is to provide an electrode, which, when employed either as an end element or as a member of a couple, will assure suitable spacing between adjacent faces of the plates correspondingly supported by opposite walls of a suitable cell.

Another object of this invention is to provide a storage battery electrode couple comprising plates of opposite polarity so joined that they may be readily detached and one or the other plate replaced.

Another object of this invention is to provide such a detachable connected electrode couple, the connection securing means of which may be manually adjusted without subjecting person making such adjustment to risk of receiving a serious electric shock, when such couple is in a working or charging battery.

Another object of this invention is to provide an electrode which may be placed in position in, or removed from, adjacent cells of the working or charging battery without thereby exposing person placing or removing same to electric shock.

Another object of this invention is to provide an electrode couple which will assure maintenance of proper relative positioning of the component electrodes during necessary handling and when in use, and be adapted to be "knocked-down" for shipment.

Another object of this invention is to provide an electrode couple which may be shipped "knocked-down," and thereafter suitably assembled without employing special skill or appliances of any kind.

Another object of this invention is to provide storage battery electrodes which will be adapted for connection in couples for use in adjacent cells, and which will render readily apparent the unsuitability of the relationship between connected electrodes of like polarity.

Another object of this invention is to provide storage battery electrodes which will disclose, upon casual inspection, errors of alternation of polarities in the placing of such electrodes in a battery.

Other objects of this invention will be in part apparent and in part more particularly referred to in the following specification.

In constructing this invention,—electrodes are provided, of one polarity or the other, each having connecting structure adapted to serve equally well when employed as an end element or as member of a couple.

To assure suitable spacing between the adjacent surfaces of connected pairs of such electrodes, each is provided with a lug or projection so formed and positioned as to assume abutting relation to the corresponding lug of a similar electrode when mounted in intended relation thereto in an adjacent cell. Such lugs being so formed and positioned as to be adapted to engage the top edges of suitable cell walls to support such electrodes therein, and to sufficiently space the active surfaces of such electrodes from the walls of cells in which they are employed.

In order that such electrodes will be suitably spaced both from one another and from the adjacent walls of cells in which they are employed, either when serving as members of electrode couples or when serving as end elements,—the aforesaid lug structure is disposed in a hook-shape, the interior face of such hook being so formed and positioned as to be adapted to engage the inner face and top of a cell wall to properly space and support such electrode therefrom, as hereinbefore stated, and the inner wall of the free end or bill of said hook being correspondingly positioned with relation to the outer face of such a cell wall,—so that when the seat of said hook rests upon the upper edge of such a suitable cell wall the electrode supported thereby will be held in suitable relation to such supporting wall, and will be prevented from movement toward the opposite supporting wall, such as might bring any part of such electrode into contact with or in undesirably close proximity to a corresponding electrode similarly supported in relation to such opposite wall.

The connecting structure of such electrodes extends a suitable distance from the active surfaces thereof, the free end of such structure being disposed at an angle to one of such active surfaces, and such free end being so formed and positioned as to be adapted to extend parallel to and engage the free end of the corresponding structure of a similar electrode of opposite polarity if mounted in intended relation thereto in an adjacent cell, and so that if mounted in corresponding relation to another electrode of like polarity, such free ends will not be correspondingly positioned.

With a view of rendering readily apparent the unsuitability of the relationship between connected electrodes of like polarity,—and for the further purpose of providing a structure which will disclose upon casual inspection, errors of alternation of polarities in the placing of such electrodes in a battery,—the free ends of the connecting structures of electrodes of opposite polarity are disposed in different planes so that, when such free ends are connected in the intended manner, the intended relative spacing and positioning of such electrodes will be assured, and so that, if corresponding structures of electrodes of like polarity are similarly connected, a noticeable departure from the intended relative spacing and positioning of such electrodes will be assured.

In order to conveniently and inexpensively assure such relative spacing and such ready disclosure of errors of alternation of polarities,—the free ends of such connecting structures are positioned for one polarity substantially the same distance above the seat or face provided for the support of the electrode in an intended cell as is the distance from the upper face of a corresponding structure of an electrode of opposite polarity to the supporting seat thereof, so that when such electrodes of opposite polarity are installed in adjacent cells as members of an electrode couple, the free end of the connecting structure of the electrode of a predetermined polarity will overlap and be in contact with the free end of the corresponding structure of the other of such electrodes.

In order to join such electrodes in such a manner that they may be readily detached and one or the other replaced, clamping means is provided for maintaining the free ends of the connecting structures of such plates in desired physical relation and in effective electrical connection.

If it is desired to provide facilities for protecting persons from serious electrical shock when placing and removing such electrodes, an insulating handle is provided for each electrode. For the further purpose of protecting persons from such a shock while they are engaged in adjusting the detachable connecting means of such electrodes, whether used as members of couples or as terminal elements, such insulating handle is applied to the connecting or clamping means.

If such electrode couples are to be shipped "knocked-down," and if it is desired to assure the maintenance of intended relationship between the various parts of such electrodes when employed either as members of couples or as terminal elements, the connecting structure should have such degree of inflexibility as will maintain such relationship even after being subjected to the strains ordinarily incident to transportation, assembly and use.

The accompanying drawing shows embodiments of the various features of this invention which have been hereinbefore referred to, as well as certain features which will be hereinafter described in greater detail; but this invention is not limited to the embodiment so shown and described, as various changes in form and arrangement may be made, and various features of this invention may be used singly or in combinations comprising less than all of said features, without departing from the spirit of this invention.

In the accompanying drawing,—in which like reference characters denote similar parts,—the jars or cells 21, 21 are shown mounted in usual relation, the adjacent sides of said jars being suitably supported by the abuttingly disposed bosses 22 carried thereby.

The upper portions of the front sides of such jars are shown broken away to more clearly disclose the arrangement of the electrodes therein.

The electrode 23 forms the positive terminal element of the storage battery shown in the drawing, and the electrode 23' forms the positive element of the electrode couple therein shown. The electrode 24 forms the negative terminal element of said battery and the electrode 24' forms the negative element of said couple. Each of said electrodes is provided with a hook-shaped supporting lug 25 having a seat 26 resting upon the upper edge of the cell wall nearest to such electrode.

Each of said electrodes has active faces 27 one of which is presented toward and is in comparatively close proximity to a wall of the cell containing such electrode. Each lug 25 extends at an angle to such active face.

The exterior faces 28 of the various lugs are each so formed and positioned as to be adapted to assume abutting relation to a corresponding lug of a similar plate mounted in intended relation thereto in an adjacent cell, as are the indicated abuttingly disposed faces 28 of the electrodes 23' and 24', so as to maintain such plates in desirably spaced relation from one another.

The interior faces 29 and 29' of said supporting hooks extend parallel to one another and to the active faces 27 of the electrode associated therewith. Such interior faces are so spaced and of such length as to be adapted to so engage the upper edge of a suitable cell wall as to prevent such movement of the electrode with relation to such wall as would objectionably decrease the space between said wall and the active surface of the electrode, or such as might bring any part of said electrode into contact with or in undesirably close proximity to a corresponding electrode similarly supported by the opposite wall of such cell.

Each electrode is provided with a connecting strap 30 extending a suitable distance from the plate or active surfaces 27 of such electrode; the free end of which strap is disposed at an angle to one of the active plate faces 27, so that the lug 25 and seat 26 will be situated within said angle.

The free ends 31 of the straps of the positive electrodes 23 and 23' are so positioned that the upper faces thereof will be situated a distance from the seats 26 of the supporting lugs 25 associated therewith, which distance will be substantially the same as the distance from the under faces of the free ends 32 of the straps of the negative electrodes 24 and 24'; to the end that when electrodes of opposite polarity form members of a couple (as in the case of the electrodes 23' and 24'), the free ends of the straps thereof will be disposed in overlapping relation and, when clamped together as shown, will maintain the seats 26 associated therewith in substantial alinement.

Each strap end is suitably perforated, having an opening therethrough as indicated by the dotted line 33 shown in the strap 30 of electrode 23. Connecting means is provided for the straps of the terminal electrodes and for the electrode couples,—such means comprising the nut 34, and the insulating handle or thumb-nut 35 having the threaded stud 36 which projects downwardly through the opening 33 and suitably engages the nut 34. In the instance of terminal elements, such as the elements 23 and 24, such connecting or clamping means are adapted to suitably secure desired terminal conductors to said strap ends. In the case of electrode couples, such clamping means is adapted for clamping the free ends of the connecting straps of the couple members, so as to keep such members in desired physical relation and in effective connection.

It will be noted that the under side of the free ends 31 of the positive electrodes 23 and 23' are so spaced from the tops of their associated lugs 25 as to be adapted to receive the suitable nut 34 therebetween; and that the under side of the connecting straps 32 of the negative elements 24 and 24' are spaced from the tops of the lugs 25 associated therewith, so as to be adapted to receive the suitable nut 34 and the free end 31 of the positive electrode therebetween,—such connecting straps being of such ample size and consisting of material of such sufficient hardness and stability as to successfully resist strains to which they are likely to be subjected incident to their transportation, assembly and use, and as to retain their form as shown and described.

In the use of this invention, if it is desired to remove an electrode couple from a battery having such electrodes as comprise this invention, the insulating handle 35 of such couple may be grasped without exposure to serious electric shock. After removal of such a couple, the elements may be disconnected one from the other, and either element reassembled with a new element, and such renewed couple may thereupon be correspondingly installed in the battery.

Should there be indications of a loose connection, as by line current fluctuations or otherwise, the various connections may be tested, and, if necessary, tightened by grasping the insulating thumb-nut without incurring exposure to serious electric shock.

Because of the engagement of the upper edges of the cell walls by the hook-shaped lugs, desirable spacing between electrodes of opposite polarity, and between active surfaces of respective electrodes and adjacent cell walls will be assured without the use of insulating separators or other electrode stabilizing means,—thus increasing the efficiency, life and dependability of the battery,—and enabling individual electrodes to be readily placed, removed or renewed.

Having fully described this invention what I claim and desire to secure by Letters Patent of the United States is:

1. In a storage battery electrode: a plate of desired polarity; a connecting strap; and a supporting lug for said plate positioned in suitably spaced relation between said plate and said strap, said lug being so formed and positioned for electrodes of respective polarities as to assume abutting relation to a corresponding lug of another such electrode of opposite polarity mounted in intended relation thereto in an adjoining cell of a battery, so as to suitably space the plates of such electrodes and to position said strap parallel to and for suitably engaging a corresponding strap of such other electrode, whereby said strap will not be so positioned for a corresponding strap of another similarly mounted electrode of like polarity.

2. In a storage battery electrode: a plate of desired polarity; a connecting strap; and a supporting lug for said plate positioned in suitably spaced relation between said plate and said strap, said lug being so formed and positioned as to assume abutting relation to a corresponding lug of a similar electrode, if mounted in intended relation thereto in an adjoining cell of a battery, so as to suitably space the plates of such electrodes and to position said strap so as to be adapted to extend parallel to and suitably engage a corresponding strap of such a similar electrode, the lower face of said strap being positioned, for plates of one polarity, substantially the same distance from the lower face of said lug as the distance between the upper face of such a strap and the lower face of such a lug for plates of the opposite polarity.

3. A storage battery electrode couple comprising a positive and a negative plate, each of said plates having a supporting lug and a connecting strap; detachable connecting means for said straps, and such relative formation and arrangement of said lugs, straps and means as will maintain intended spacing between said plates if they are supported by said straps.

4. A storage battery electrode couple comprising a positive and a negative plate; abutting supporting lugs and overlapping connected straps, one lug and one strap for each plate; and an insulated handle secured to the overlapping portion of said straps.

5. A storage battery electrode couple comprising a positive and a negative plate; abutting supporting lugs and overlapping connecting straps, one lug and one strap for each plate; and clamping means for said connecting straps, said means comprising an insulated thumb-nut.

6. A storage battery electrode couple comprising a positive and a negative plate; abutting supporting lugs and overlapping connecting straps, one lug and one strap for each plate; an insulating handle mounted above said straps and having a threaded stud extending through and below said straps; and a nut engaging the projecting end of said stud.

7. A storage battery electrode couple comprising a positive and a negative plate, each of said plates having vertical active faces and having a supporting lug and a connecting strap, said lugs being positioned in suitably spaced relation between one of said active faces and a free end of the connecting strap associated therewith respectively, and being so formed and positioned as to abut when mounted in intended relation, said straps having correspondingly positioned openings through the free ends thereof, which free ends extend a suitable distance from their respective associated plates and are disposed in overlapping relation in a plane substantially perpendicular to one of said active faces and so that said openings will register when said lugs are in intended abutting relation; an insulating handle mounted above said straps and having a threaded stud extended downwardly therefrom through and below said straps; and a nut disposed between said straps and said lugs and engaging the projecting end of said stud to maintain said plates in desired physical relation and to maintain an effective electrical connection therebetween.

In witness whereof I hereunto subscribe my name, this 30th day of January, 1920.

VINCENT C. STANLEY.

Witnesses:
 CHARLES H. MOULTON,
 NATHAN H. SUREN.